US011375177B2

(12) United States Patent
Liu et al.

(10) Patent No.: US 11,375,177 B2
(45) Date of Patent: Jun. 28, 2022

(54) METHOD, APPARATUS, DEVICE FOR LIGHT-FIELD DISPLAY, AND RECORDING MEDIUM

(71) Applicant: BOE TECHNOLOGY GROUP CO., LTD., Beijing (CN)

(72) Inventors: Jiayao Liu, Beijing (CN); Xue Dong, Beijing (CN); Xiaochuan Chen, Beijing (CN); Wenqing Zhao, Beijing (CN); Wei Wang, Beijing (CN); Ming Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 192 days.

(21) Appl. No.: 16/622,983

(22) PCT Filed: Oct. 30, 2018

(86) PCT No.: PCT/CN2018/112614
§ 371 (c)(1),
(2) Date: Dec. 16, 2019

(87) PCT Pub. No.: WO2020/087261
PCT Pub. Date: May 7, 2020

(65) Prior Publication Data
US 2021/0360222 A1 Nov. 18, 2021

(51) Int. Cl.
*H04N 13/30* (2018.01)
*H04N 13/32* (2018.01)
(Continued)

(52) U.S. Cl.
CPC ............... *H04N 13/32* (2018.05); *G09G 3/00* (2013.01); *G09G 3/342* (2013.01)

(58) Field of Classification Search
CPC .......................... H04N 13/349; H04N 13/351
(Continued)

(56) References Cited

U.S. PATENT DOCUMENTS

2009/0058845 A1* 3/2009 Fukuda ................. B60K 35/00
345/214
2010/0033473 A1* 2/2010 Hsieh ................... G09G 3/3607
345/213
(Continued)

FOREIGN PATENT DOCUMENTS

CN     204904760 A    12/2015
CN     106297610 A     1/2017
CN     207676061 U     7/2018

*Primary Examiner* — Jeffery A Williams
(74) *Attorney, Agent, or Firm* — Dave Law Group LLC; Raj S. Dave (57) ABSTRACT

The present application provides a light-field display apparatus. The apparatus includes: a display screen, the display screen including N display regions, each display region of the N display regions including M light-emitting points, and light-emitting points at a corresponding position of the N display regions being a light-emitting point group; driving circuits, configured to drive the light-emitting points to emit light; a lens group including at least one lens, the light-emitting points in the N display regions forming view zones corresponding one by one to the N display regions by the lens group, wherein light-emitting points belonging to a same light-emitting point group in the N display regions are driven by a same driving circuit, the N view zones are not overlapped with each other, and both N and M are positive integers greater than 1.

5 Claims, 7 Drawing Sheets

(51) Int. Cl.
    *G09G 3/00*            (2006.01)
    *G09G 3/34*            (2006.01)
(58) Field of Classification Search
    USPC .......................................................... 348/51
    See application file for complete search history.

(56) References Cited

U.S. PATENT DOCUMENTS

2014/0267639 A1\* 9/2014 Tatsuta ................. H04N 13/351
                                                                348/59
2016/0358522 A1   12/2016 Du
2019/0166359 A1\* 5/2019 Lapstun ............... H04N 13/383

\* cited by examiner

METHOD, APPARATUS, DEVICE FOR LIGHT-FIELD DISPLAY, AND RECORDING MEDIUM

CROSS-REFERENCE

The present application is the U.S. national stage of International Patent Application No. PCT/CN2018/112614, filed Oct. 30, 2018, the entire disclosure of which is incorporated herein by reference as part of the present application.

TECHNICAL FIELD

The present disclosure relates to the field of light-field display, and more particularly to a method, an apparatus, a device for light-field display, and a recording medium.

BACKGROUND

In the process of light-field display, images in different view zones need to be displayed, and thus the amount of data required for the light-field display is much larger than that required for traditional flat-panel displaying. The amount of data may also be referred to as the amount of information, that is, content displayed in the light-field display, for example, by pixels.

In the related art, it is difficult to increase the number of pixels in a display by an order of magnitude due to limitation of fabrication process of driving circuits. Therefore, when a traditional displayer is applied in the light-field display, the amount of data displayed by the displayer is much less than the amount of data required for the light-field display due to limitation of the number of pixels, so that a light-field display system can only reproduce light field information within a very small range, resulting in too small range of view zones and difficulty in practicality.

In addition, stereoscopic images displayed by the light-field display also needs to include information on depth of field, that is, to display images at different depths of field, and displayed content at each depth of field is a two-dimensional planar image. A large amount of image information at different depths of field is also required to achieve a good light-field display effect, and the display effect of the above-mentioned information on depth of field is also affected by the small number of pixels of the display screen and the insufficient amount of data.

SUMMARY OF THE INVENTION

According to an aspect of the present disclosure, there is provided a method for light-field display, the light-field display including N view zones, a display screen including N display regions, the N display regions being in one-to-one correspondence with the N view zones, each display region including M light-emitting points, and light-emitting points at a corresponding position of the N display regions being a light-emitting point group, the method comprising: driving light-emitting points belonging to a same light-emitting point group of the N display regions using a same driving circuit, wherein the N view zones are not overlapped with each other, and both N and M are positive integers greater than 1.

According to some embodiments of the present disclosure, each light-emitting point is one pixel, each display region includes M pixels and the N display regions have M light-emitting point groups.

According to some embodiments of the present disclosure, the N display regions form the N view zones by one lens, or form the N view zones by a plurality of lenses.

According to some embodiments of the present disclosure, pixels of the N display regions are arranged in a same manner.

According to some embodiments of the present disclosure, the method further comprises: for at least one display region of the N display regions, connecting the display region to driving circuits by switches, the switches being configured to turn on or turn off driving of the display region by the driving circuits.

According to some embodiments of the present disclosure, the connecting the display region to the driving circuits by the switches comprising: connecting the M light-emitting points in the display region to the corresponding driving circuits respectively by M switches.

According to some embodiments of the present disclosure, the display screen includes k display screens, and k is a positive integer greater than or equal to 1, in a case where k is greater than 1, each display screen of the k display screens including N display regions, and corresponding view zones of the N display regions of each display screen of the k display screens overlapping with each other.

According to some embodiments of the present disclosure, wherein the display screen includes M pixels, each pixel of the M pixels comprising N light-emitting points formed by a mask, the N light-emitting points of each pixel corresponding to one light-emitting point group, the display screen comprising M light-emitting point groups, each display region of the N display regions is formed by the light-emitting points at corresponding positions in the M light-emitting point groups, wherein the M pixels respectively correspond to M lenses, and the light-emitting points in the N display regions form N view zones corresponding to the N display regions one by one by the M lenses.

According to another aspect of the present disclosure, there is provided a light-field display apparatus, comprising: a display screen, the display screen including N display regions, each display region of the N display regions including M light-emitting points, and light-emitting points at a corresponding position of the N display regions being a light-emitting point group; driving circuits, configured to drive the light-emitting points to emit light; a lens group including at least one lens, the light-emitting points in the N display regions forming view zones corresponding one by one to the N display regions by the lens group, wherein light-emitting points belonging to a same light-emitting point group in the N display regions are driven by a same driving circuit, the N view zones are not overlapped with each other, and both N and M are positive integers greater than 1.

According to some embodiments of the present disclosure, each light-emitting point is one pixel, each display region includes M pixels and the N display regions have M light-emitting point groups; the N display regions form the N view zones by one lens, or form the N view zones by a plurality of lenses; pixels of the N display regions are arranged in a same manner.

According to some embodiments of the present disclosure, the method further comprises switches connecting at least one display region of the N display regions and the driving circuits of the display region and configured to turn on or turn off driving of the display region by the driving circuits.

According to some embodiments of the present disclosure, the connecting includes: connecting the M light-emitting points in the display region to the corresponding driving circuits respectively by M switches.

According to some embodiments of the present disclosure, the display screen is k display screens, and k is a positive integer greater than or equal to 1, in a case where k is greater than 1, each display screen of the k display screens including N display regions, and corresponding view zones of the N display regions of each display screen of the k display screens overlapping with each other.

According to some embodiments of the present disclosure, wherein the display screen includes M pixels, each pixel of the M pixels comprising N light-emitting points formed by a mask, the N light-emitting points of each pixel corresponding to one light-emitting point group, the display screen comprising M light-emitting point groups, each display region of the N display regions is formed by the light-emitting points at corresponding positions in the M light-emitting point groups, wherein the M pixels respectively correspond to M lenses, and the light-emitting points in the N display regions form N view zones corresponding to the N display regions one by one by the M lenses.

According to another aspect of the present disclosure, there is further provided a light-field display device, comprising: one or more processors; and one or more memories, wherein computer readable code is stored in the memories, and the computer readable code performs the method for light-field display mentioned above when executed by the processors.

According to another aspect of the present disclosure, there is further provided a computer readable recording medium, wherein computer readable code is stored in the computer readable recording medium, and the computer readable code performs the method for light-field display mentioned above when executed by processors.

BRIEF DESCRIPTION OF THE DRAWINGS

The accompanying drawings required in description of embodiments of the present disclosure and prior art will be briefly described below to illustrate technical solutions of the embodiments and the prior art more clearly. It is obvious that the drawings in the following description are merely some of the embodiments of the present disclosure, and other drawings may be obtained based on these drawings by a person of ordinary skill in the art without creative efforts.

DESCRIPTION OF THE EMBODIMENTS

The technical solutions of the embodiments of the present disclosure will be clearly and thoroughly described below in conjunction with the accompanying drawings of the embodiments of the present disclosure. Apparently, the described embodiments are merely a part but not all of the embodiments of the present disclosure. All other embodiments obtained by a person of ordinary skill in the art based on the embodiments of the present disclosure without creative efforts fall within the scope of the present disclosure.

The terms 'first', 'second' and the like used in the present disclosure do not mean any order, quantity, or importance, but are used to distinguish different components. Similarly, the terms 'comprise', 'include' and the like mean that elements or objects before the terms cover elements or objects or equivalents thereof listed after the terms, without excluding other elements or objects. The terms "connection" or "connect" and the like are not limited to physical or mechanical connections, but may comprise electrical connections, whether directly or indirectly.

In the process of the light-field display, image information at different depths of field need to be displayed, and image information of each depth of field is equivalent to a two-dimensional image. Therefore, the amount of data required in the light-filed display is much larger than the amount of data required in the traditional flat-panel display (which displays information of only one two-dimensional image).

In particular, the amount of data mentioned above may also be referred to as the amount of information, that is, content displayed by the light-field display. For example, in a two-dimensional flat-panel display process, the displayed image information includes only information on color and brightness and the like of image points on the two-dimensional plane. However, in the light-field display, the displayed stereoscopic images further include information on depth of field, which may be simply understood as the displayed content at each depth of field is a two-dimensional plane image. A large amount of image information at different depths of field is required while dynamic display of parallax information is also required, to achieve a better light-field display effect. A viewer may observe the displayed content at different depths of field with the parallax information when view from different angles, reflecting depth information of stereoscopic displaying.

It can be seen that a larger amount of image content in both dimension of the depth of field and dimension of parallax direction need to be displayed in the light-field display compared with the two-dimensional flat-panel displaying. Therefore, in the light-field display process, the more the number of pixels used for displaying, the finer the images of the light-field displays, the larger the depth of field covers, the richer the image details can be reproduced, and the wider the view angle can be achieved.

However, it is difficult to increase the number of pixels by an order of magnitude due to the limitation of fabrication process of control circuits in flat-panel displays. In this case, optimizing pixel structure of the displayer for light-field display to increase the amount of data displayed and range of view zones of a light-field display system becomes the key of the light field display's practical use.

The present disclosure provides a method for a light-field display, which employs a same driving circuit for driving light-emitting points displaying a same content in different view zones, so that the number of view zones and visible range of the light-field display are increased, without increasing the number of driving circuits, thereby enabling the light-field display's practical use. The light-emitting points can correspond to one pixel or correspond to a portion of one pixel.

According to the embodiments of the present disclosure, in the method for light-field display, the light-field display includes N view zones, and the display screen includes N display regions which are in one-to-one correspondence with the N view zones. Each display region includes M light-emitting points, and the light-emitting points at a corresponding position of the N display regions are a light-emitting point group. The method comprises: driving light-emitting points of a same light-emitting point group in the N display regions by using a same driving circuit, wherein the N view zones do not overlap with each other, and both N and M are positive integers greater than 1.

Figure 1:
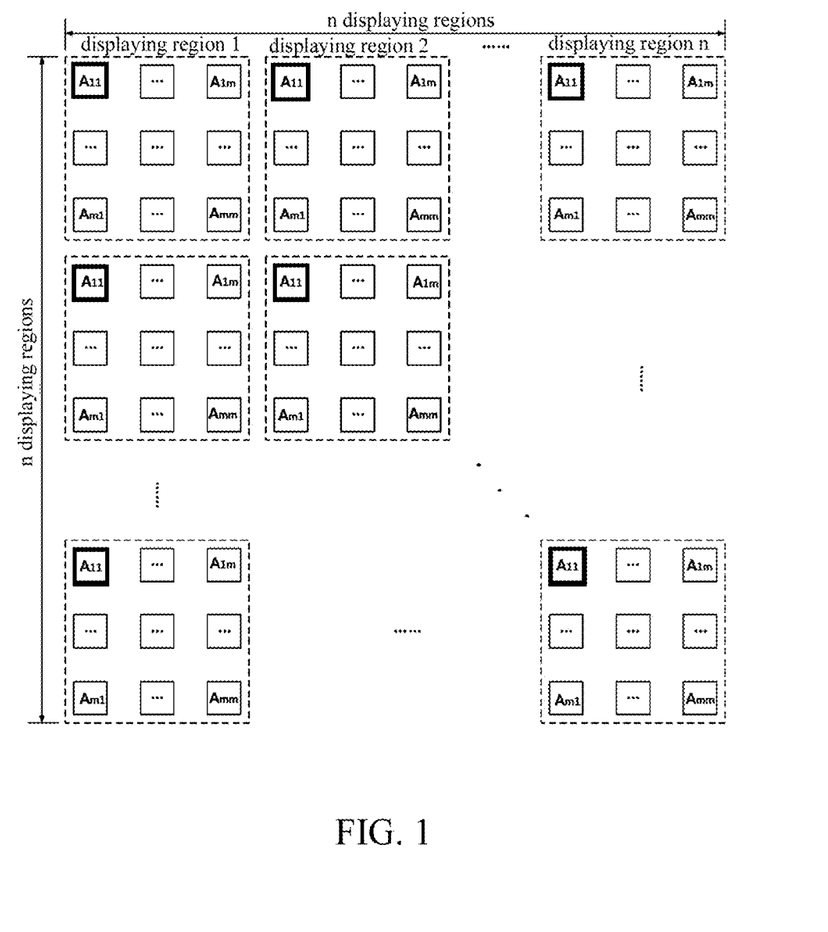
FIG. 1 shows a schematic diagram of a display screen according to the embodiments of the present disclosure.
Figure 2A:
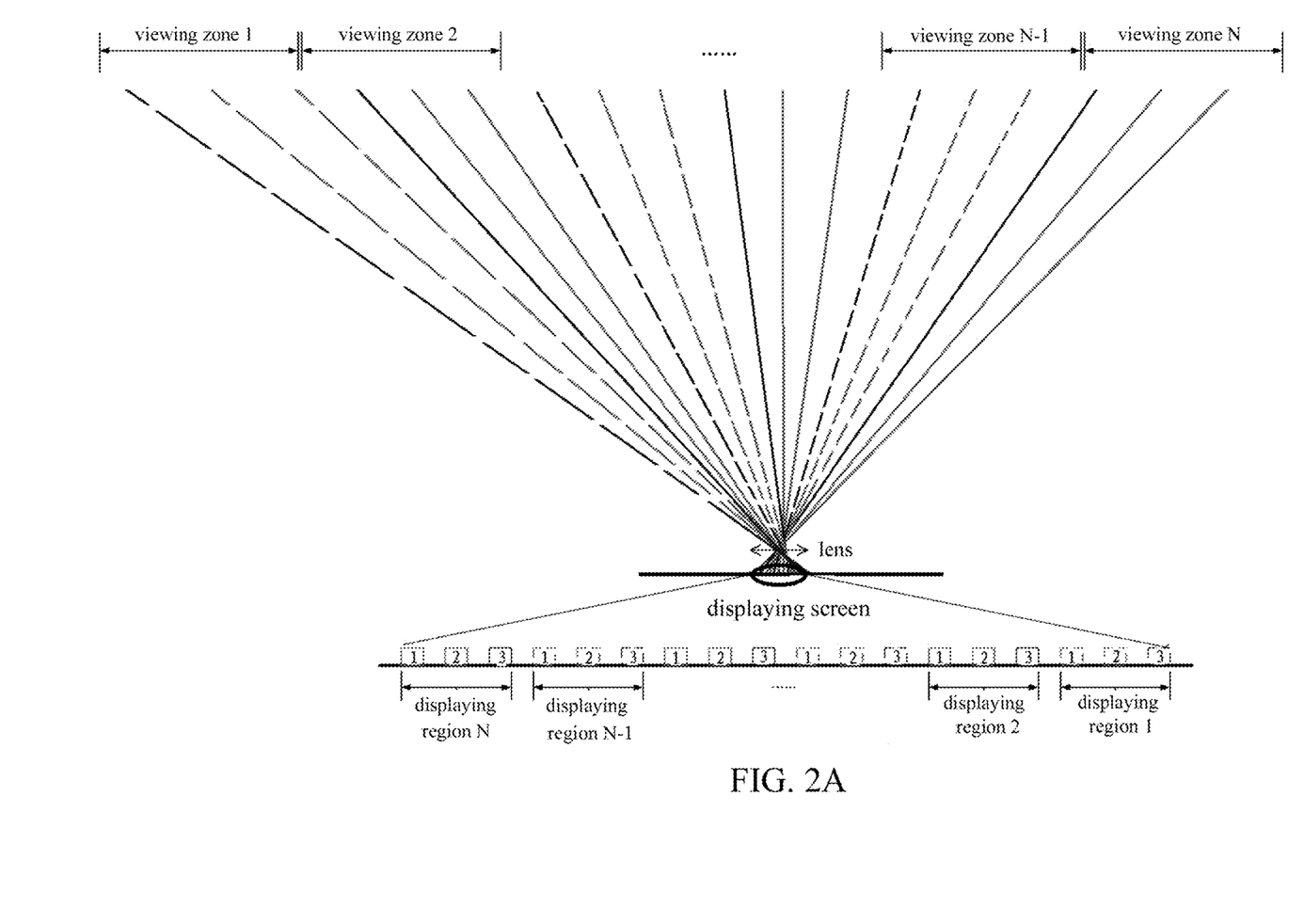
FIG. 2A shows a schematic diagram of a correspondence relationship between a display screen and view zones according to the embodiments of the present disclosure.

FIG. 1 shows a schematic diagram of a display screen according to the embodiments of the present disclosure. FIG. 2A shows a schematic diagram of a correspondence relationship between a display screen and view zones according to the embodiments of the present disclosure. The method for light-field display according to the embodiments of the present disclosure will be described in detail below in conjunction with FIG. 1 and FIG. 2A.

As shown in FIG. 1, the display screen may be, for example, a flat panel displayer having light emitting points disposed thereon. On the display screen shown in FIG. 1, the light-emitting points correspond to one pixel. In other embodiments in accordance with the present disclosure, the light-emitting points may also correspond to a portion of one pixel, as will be described in detail below.

According to the embodiments of the present disclosure, pixels arranged on the display screen as shown in FIG. 1 may be divided into n*n=N display regions, and each display region may include m*m=M pixels (as shown by a dotted frame). Pixels of each display region of the N display regions are arranged in a same manner. It should be noted that the number of display regions and the number of pixels in each display region are merely exemplary. In other embodiments according to the present disclosure, the pixels on the display screen may also be divided into n1*n2 display regions, and each display region may include m1*m2 pixels, wherein n1≠n2, m1≠m2.

As shown in FIG. 1, display content is the same for pixels at same position in each of the N display regions. For example, display content of the first pixel $A_{11}$ in each display region is the same. Therefore, display content of each display region on the display screen is the same.

In the embodiments of the present disclosure, the display screen may be, for example, a flat panel displayer having light emitting points disposed thereon. The light-emitting points at a corresponding position of the N display regions are a light-emitting point group. For example, the display screen in FIG. 1 may be divided into M light-emitting point groups, where a light-emitting point group $G_{11}$ includes pixels $A_{11}$ in each display region shown in FIG. 1, and a light-emitting point groups $G_{1m}$ may include pixels $A_{1m}$ in each display region. Display contents of pixels included in each of the light-emitting point groups are the same, and therefore, a same driving circuit may be used to drive the pixels in the display screen belonging to a same light-emitting point group. For example, one driving circuit may be configured to drive the light-emitting point group $G_{11}$ including the pixels $A_{11}$, and another driving circuit may be configured to drive the light-emitting point group $G_{1m}$ including the pixels $A_{1m}$.

As shown in FIG. 2A, N view zones may be formed in an image space by the display content passing through one lens. The N view zones do not overlap with each other, and the N display regions are in one-to-one correspondence with the N view zones. Since display contents of pixels at a same position of each display region in FIG. 1 are the same, display contents of each view zone at a corresponding position formed by the respective display regions passing by the lens are the same. For example, a display region N corresponds to a view zone N, a display region N−1 corresponds to a view zone N−1, and so on, and display contents of each view zone are the same.

As shown in FIG. 2A, the N display regions form the N view zones by passing through a same lens. According to some other embodiments of the present disclosure, the N view zones may also be formed by a plurality of lenses. When the pixels in the display regions are imaged by a lens, light-emitting directions of the pixels are determined by a positional relationship between the pixels and the lens and a focal length of the lens, so that the positional relationship between the lens and the pixels may be designed according to practical parameters.

In the method for light-field display according to the embodiments of the present disclosure, the display screen is composed of N display regions (n*n), each of the display regions is composed of M pixels (m*m), as shown in FIG. 1, and display contents of pixels at a same position of each display regions are the same. Those pixels at a same position and having the same display content in the display region are referred to as a light-emitting point group, and a same light-emitting point group is driven by a same driving circuit, that is, one set of driving circuit simultaneously controls pixels at a same position in each display region, thereby enabling driving of M*N pixels by using M driving circuits. When the above display screen is used for light-field display, each display region forms a respective view zone at different positions of the image space by one lens (as shown in FIG. 2A), and all of the view zones constitute a complete visible space.

In light-field display in which the display region division is not performed, M drive circuits can drive only M pixels, and the amount of data formed by the M pixels in the image space is equivalent to the amount of data of one view zone as shown in FIG. 2A. The method for light-field display according to the embodiments of the present disclosure may achieve driving M*N pixels by M driving circuits, and the M*N pixels may form N view zones by a lens group including at least one lens. It can be seen that the method for light-field display according to the present disclosure may increase the visible range of the light-field display system from the original one view zone to the N view zones without increasing the number of driving circuits, thereby achieving light-field display of large visible range and increasing the amount of data of the light-field display by N times.

Figure 2B:
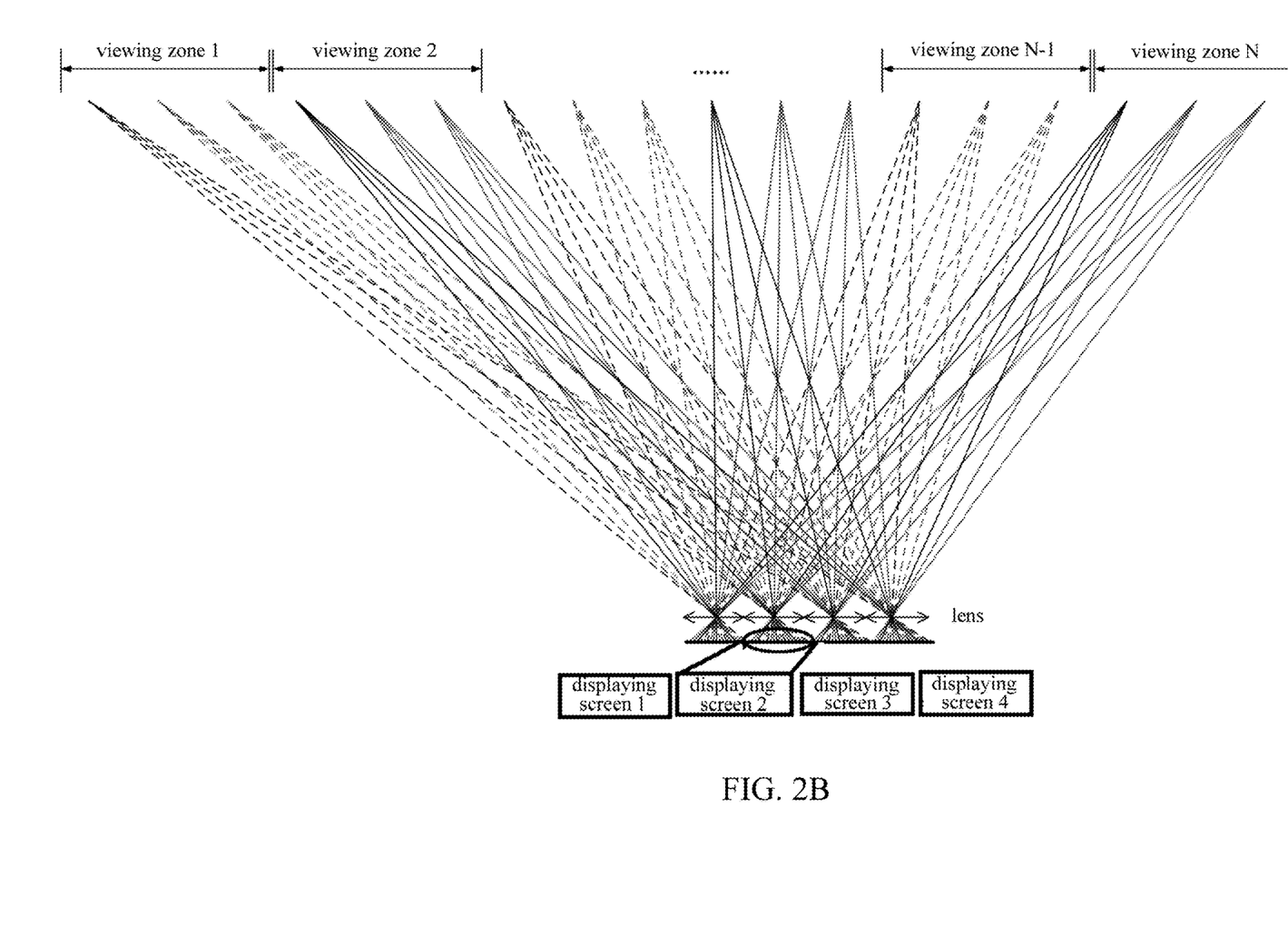
FIG. 2B shows a schematic diagram of a correspondence relationship between a plurality of display screens and view zones according to the embodiments of the present disclosure.

According to the embodiments of the present disclosure, k display screens as shown in FIG. 2A may further be included, and k is a positive integer greater than or equal to 1. FIG. 2B shows a schematic diagram of a correspondence relationship between a plurality of display screens and view zones according to the embodiments of the present disclosure, wherein k is equal to 4. Each display screen of the k display screens includes N display regions, and corresponding view zones of the N display regions of each display screen of the k display screens overlap with each other.

For example, as shown in FIG. 2B, respective display regions 1 of display screens 1, 2, 3, and 4 form respective view zones N in the image space. The respective view zones N overlapping with each other. Respective display regions N of the display screens 1, 2, 3 and 4 form respective view zones 1 in the image space. The respective view zones 1 also overlapping with each other.

According to the embodiments of the present disclosure, as shown in FIG. 2A, the lens corresponding to the display screen may be a single lens, a micro-lens, a liquid crystal lens, or the like, and parameters of the lens may be designed according to the parameters such as size of the display screen, sizes of pixels, and the like, which does not constitute as a limitation of the present disclosure. In the case that there are a plurality of display screens as shown in FIG. 2B, it may also be implemented by a lens array or a micro-lens array, which does not constitute as a limitation of the present disclosure, either. The lens array or the micro-lens array comprising a plurality of lenses.

The plurality of display screens shown in FIG. 2B form view zones that overlap with each other by the plurality of lenses, so that the amount of data of display contents in the image space may be increased, that is, the depth of field and the parallax information of the light-field display are increased and display effect of the light-field display is improved, thereby solving the problem of insufficient amount of data in the light-field display due to the limited number of pixels in the prior art.

The method for light-field display according to the present disclosure may further comprise: for at least one display region of the N display regions, connecting the display region to driving circuits by switches, the switches being configured to turn on or turn off the driving of display region by the driving circuits. Connecting the display region to the driving circuits by the switches comprises connecting the M light-emitting points of the display region to corresponding driving circuits by M switches, respectively.

According to the embodiments of the present disclosure, the switches connected to the driving circuits may control whether light-emitting points connected thereto emit light or not, thereby controlling whether corresponding view zones are formed in the image space, such that an anti-spying function in the light-field display process is realized. For example, the anti-spying function for the view zone N is realized by turning off the switches connecting the display region 1 and the drive circuits, that is, a viewer at the view zone N position cannot observe the display contents.

In the above method for light-field display according to the present disclosure, the display screen is divided into N display regions, and pixels at a same position of each display region are controlled by a same driving circuit, that is, one driving circuit simultaneously controls pixels at a same position of respective display regions, the display regions and the view zones being in one-to-one correspondence. Therefore, M pixels in each display region may be connected to M switches. For example, whether the M pixels in the display region 1 emit light or not may be controlled by using M switches 1, and on or off of the M switches connected to the display region 1 are consistent. In a case where the pixels of the display region 1 are controlled by the M switches 1 not to emit light, the corresponding view zone N is not formed in the image space, thereby realizing anti-spying effect for the view zone N, that is, a viewer from the view zone N position cannot see the display contents.

According to some other embodiments of the present disclosure, the switches may also control the display content (such as brightness, color, etc.) of light-emitting points connected to the switches to realize the anti-spying function. For example, display content of light-emitting points in a display region are controlled by the switches, so that the view zone corresponding to the display region displays different content compared with other view zones, that is, the anti-spying effect is realized by changing the display content.

Figure 3:
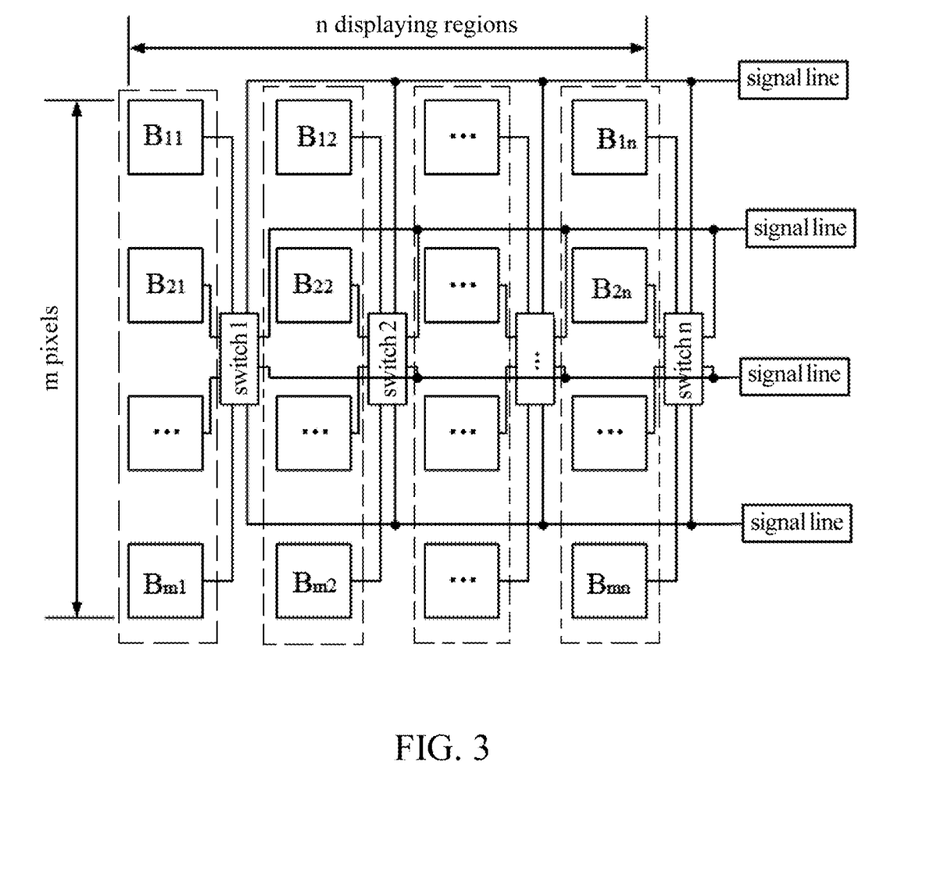
FIG. 3 shows a schematic diagram of a connection relationship between a display screen and switches according to the embodiments of the present disclosure.
Figure 4:
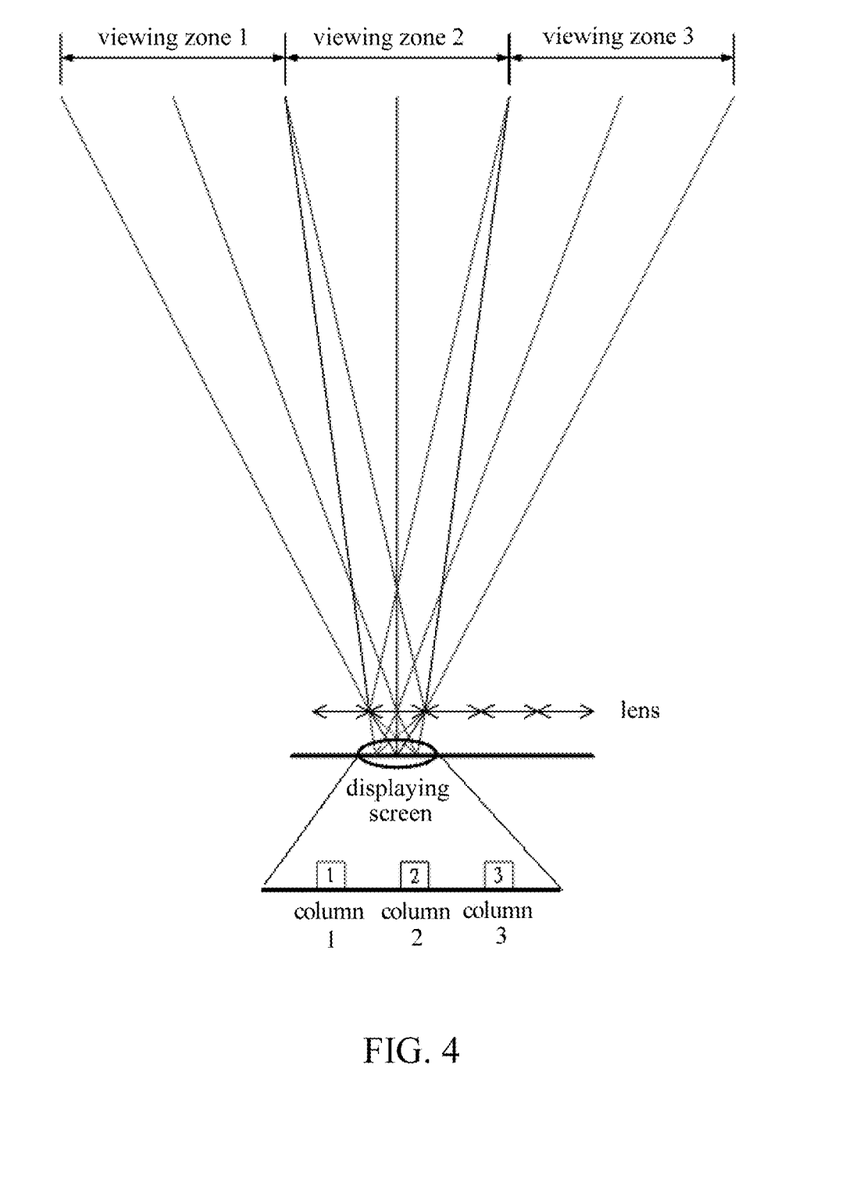
FIG. 4 shows a schematic diagram of a correspondence relationship between the display screen shown in FIG. 3 and view zones.

FIG. 3 shows a schematic diagram of a connection relationship between a display screen and switches according to the embodiments of the present disclosure. FIG. 4 shows a schematic diagram of a correspondence relationship between the display screen shown in FIG. 3 and view zones. A process of realizing the anti-spying function by using switches according to the embodiments of the present disclosure will be described in detail in conjunction with FIG. 3 and FIG. 4.

As shown in FIG. 3, each display region shown in FIG. 1 is represented by a column of pixels for convenience of description. For example, the display region 1 includes a set of column pixels $B_{11}$-$B_{m1}$, the display region 2 includes a set of column pixels $B_{12}$-$B_{m2}$, and so on. Each display region forms a corresponding view zone in the image space. According to the embodiments of the present disclosure, pixels in each display region may be connected to respective signal lines through which driving signals of the pixels are transmitted. Thereby, pixels in the respective display regions may be connected to corresponding switches, for example, pixels in the display region 1 may be connected to a switch 1. When the switch 1 is turned on (connecting), driving of the pixels in the display region 1 by the driving circuit is turned on, that is, a driving signal may be transmitted to respective pixels in the display region 1 via the signal lines, so that the pixels emit light, thereby forming the view zone N; When the switch 1 is turned off (disconnecting), driving of the pixels in the display region 1 by the driving circuit is turned off, that is, the transmission between the signal lines and the pixels is turned off, and the pixels do not emit light, that is, the view zone N is not formed.

As shown in FIG. 4, when the switch connected to pixels included in the column 1 (corresponding to the display region 1) is turned on, the pixels of the column 1 emit light under driving of the driving circuit and form a view zone 3 in the image space by the lens, and a viewer at the view zone 3 can observe the corresponding display content. When the switch connected to the pixels included in the column 1 is turned off, the connection between the pixels of the column 1 and the driving circuit is turned off, the pixels of the column 1 do not emit light, and the display content is not presented at the position of the view zone 3 in the image space. Therefore, in this case, the viewer at the view zone 3 cannot observe the display content, while viewers at the view zone 1 and the view zone 2 can observe the display content, thereby realizing the anti-spying effect for the view zone 3.

Figure 6:
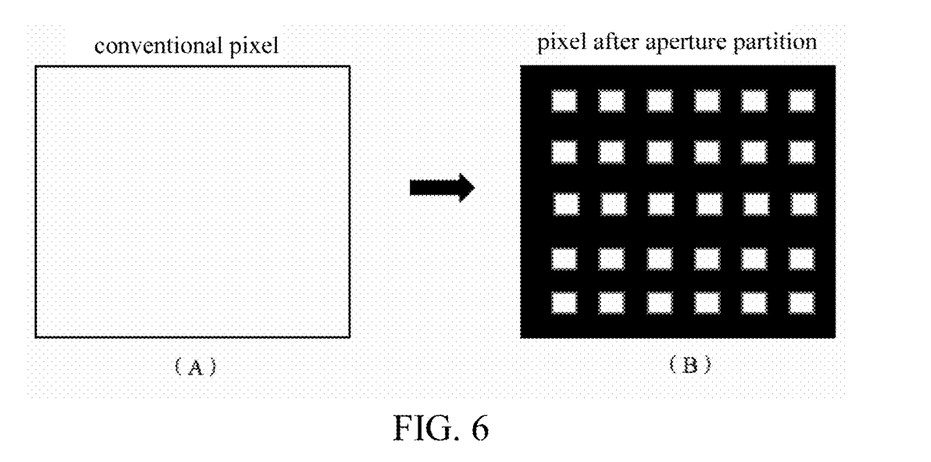
FIG. 6 shows a schematic diagram of a pixel having a plurality of light-emitting points formed by pixel aperture partition.

According to the embodiments of the present disclosure, the function of turning on and turning off between driving circuits and pixels may be achieved by the switches, thereby realizing the anti-spying function of the light-field display. According to other embodiments of the present disclosure, the function of the switches may also be achieved by controlling the driving signals. For example, when anti-spying for the position of the view zone 3 as shown in FIG. 6 is needed, that is, causing the display region 1 corresponding to the view zone 3 not being displayed, the corresponding driving signal may be controlled to cause pixels in the display region 1 do not emit light, thereby realizing the anti-spying effect for the view zone 3.

According to some other embodiments of the present disclosure, the light-emitting points of the display screen also correspond to a portion of one pixel. The display screen includes M pixels, and N light-emitting points belonging to a same light-emitting point group are formed by dividing one pixel into regions.

According to the embodiments of the present disclosure, the display screen includes M pixels, each pixel of the M pixels comprising N light-emitting points formed by a mask, the N light-emitting points of each pixel corresponding to one light-emitting point group, the display screen comprising M light-emitting point groups, each display region of the N display regions is formed by the light-emitting points at corresponding positions in the M light-emitting point groups, wherein the M pixels respectively correspond to M lenses, and the light-emitting points in the N display regions form N view zones corresponding to the N display regions one by one by the M lenses.

Figure 5:
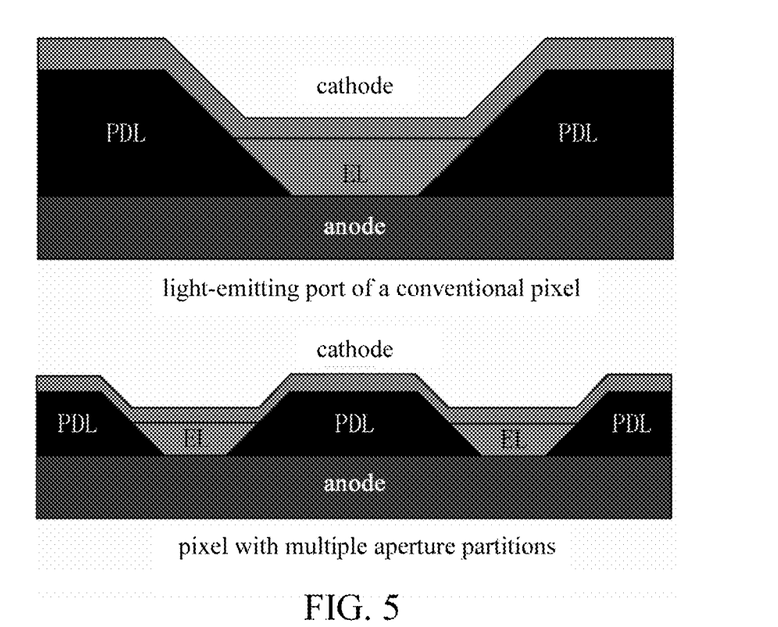
FIG. 5 shows a schematic diagram of pixel aperture partition according to the embodiments of the present disclosure.

For example, as shown in FIG. 5, the division of pixel regions may be achieved by pixel aperture partition technique. The partition may be implemented based on the existing display screen manufacturing process. There is only one light-emitting port in a conventional pixel, so that one light-emitting point may be formed. For example, N light-emitting points may be formed on each pixel by adding a light-shielding mask to the conventional light-emitting port.

FIG. 6 shows a schematic diagram of a pixel having a plurality of light-emitting points formed by pixel aperture partition. A conventional pixel includes only one light-emitting port, so that only one light-emitting point is formed when light is emitted. After processing according to the pixel aperture partition technique as shown in FIG. 5, multiple partitions may be formed on a conventional pixel, and when the pixel emits light, a plurality of light emitting points may be formed by the partitions. Therefore, as shown in FIG. 6, the number of light-emitting points of the pixel on the left side is increased from one to 30 through the pixel aperture partition.

According to the embodiments of the present disclosure, the above-described light-emitting points at different positions formed on one pixel may be referred to as a light-emitting point group. When the pixel is driven by the driving circuit to emit light, contents displayed by each of the light-emitting points are the same.

According to the embodiments of the present disclosure, the M pixels on the display screen may respectively correspond to M lenses, and light-emitting points at a corresponding position in the M light-emitting point groups are formed into one view zone by the M lenses, such that N view zones are formed by the M light-emitting point groups.

Figure 7:
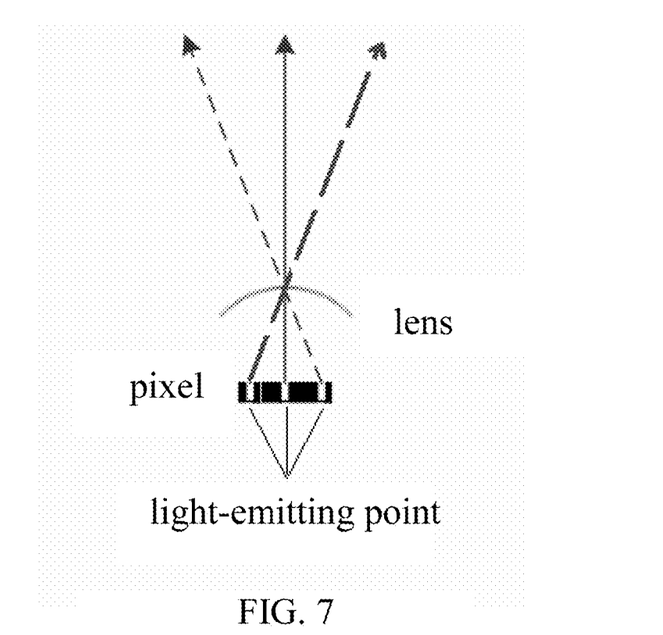
FIG. 7 shows a schematic diagram of a correspondence relationship between light-emitting points and one lens according to the embodiments of the present disclosure.

FIG. 7 shows a schematic diagram of a correspondence relationship between light-emitting points and the lens according to the embodiments of the present disclosure. As shown in FIG. 7, in one pixel, positions of light-emitting points at different positions with respect to the lens are different, and light rays in different directions are formed via the lens. Display contents of N light-emitting points of each pixel are the same, and the same display contents may be formed in the N view zones in the image space via the lens. A complete display content of the N view zones are formed in the image space by the M pixels of the display screen via the M lenses.

According to the above embodiments, for each of the M pixels on the display screen, the light-emitting region thereof is divided into N pixel partitions by means of a mask, and the N pixel partitions may form N light-emitting points. Light-emitting points at a corresponding position of the M pixels will form one view zone in the image space, and light-emitting points at different positions of each pixel correspond to different view zones in the image space. The M pixels may be controlled by M driving circuits. Therefore, according to the embodiments of the present disclosure, it is possible to drive M pixels by using M driving circuits and form N view zones in the image space. The N view zones are combined to significantly increase the visible range of the light-field display.

According to the above method for light-field display proposed by the present disclosure, a light-emitting region of a pixel is divided into a plurality of (N) small partitions without changing the driving circuit, so that the number of light-emitting points of the display screen may be multiplied (N times) (as shown in FIG. 6). Each pixel corresponds to one lens, and display contents within different view zones are formed in the image space by light-emitting points formed by different partitions of the pixel via the lens. Light rays of the different light-emitting points of the M pixels will form view zones display the same content equivalent to the number of (N) the light-emitting points in the image space. The same display content may be viewed by human eyes in all of the different view zones, and thus the visible range of the light-field display system are increased from the original one view zone to N view zones, thereby realizing the light-field display of large visible range.

According to the embodiments of the present disclosure, in performing the light-field display process, the display screen including pixel partitions may also be k display screens, and k is a positive integer greater than or equal to 1. Display regions in each display screen of the k display screens form respective view zones in the image space by the lens.

Each display screen of the k display screens includes N display regions, and corresponding view zones of the N display regions of each display screen of the k display screens overlap with each other.

For example, the respective display regions 1 of the display screens 1-*k* form respective view zones N in the image space, the respective view zones N overlapping with each other; the respective display regions N of the display screens 1-*k* form respective view zones 1 in the image space, the respective view zones 1 also overlapping with each other.

By forming view zones overlapping with each other by the above k display screens by a plurality of lenses, the amount of data of display contents in the image space can be increased, that is, the depth of field and the parallax information of the light-field display are increased and display effect of the light-field display is improved, thereby solving the problem of insufficient amount of data in the light-field display due to the limited number of pixels in the prior art.

According to the embodiments of the present disclosure, a light-field display apparatus is also provided. The light-field display apparatus comprises: a display screen including N display regions, each display region of the N display regions including M light-emitting points, light-emitting points at a corresponding position of the N display regions being a light-emitting point group; driving circuits configured to drive the light-emitting points to emit light; a lens group including at least one lens, the light-emitting points in the N display regions forming view zones corresponding one by one to the N display regions via the lens group, wherein light-emitting points belonging to a same light-emitting point group in the N display regions are driven by a same driving circuit, the N view zones do not overlap with each other, and both N and M are positive integers greater than 1. The light-emitting points may be one pixel, or may be a portion of one pixel.

According to the embodiments of the present disclosure, each of the light-emitting point is one pixel, each display region includes M pixels, and the N display regions have M light-emitting groups; the N display regions form the N view zones by one lens, or by a plurality of lenses; pixels of the N display regions are arranged in a same manner. For example, as described above, FIG. 1 shows the schematic diagram of the display screen, and FIGS. 2A and 2B show the schematic views of the display screen forming the view zones by the lenses. Driving M*N pixels by M driving circuits may be achieved with the above-described light-field display apparatus. Specifically, the method for performing light-field display by using the light-field display apparatus will not be repeatedly described herein again.

The light-field display apparatus may further comprise switches connecting at least one display region of the N display regions and the driving circuits of the display region, and configured to turn on or turn off the driving of the display region by the driving circuits. The M light-emitting points of the display region may be respectively connected to corresponding driving circuits by M switches. For example, the anti-spying function for the view zone N is realized by turning off the switches connecting the display region 1 and the drive circuits, that is, a viewer at the view zone N position cannot observe the display content.

According to some other embodiments of the present disclosure, the display screen may include M pixels, and N light-emitting points belonging to a same light-emitting point group are formed by aperture partition of one pixel; the M pixels respectively correspond to M lenses, and one view zone are formed by light-emitting points at a corresponding position in the M light-emitting point groups by the M lenses, so that N view zones are formed by the M light-emitting point groups; the N light-emitting points are formed using a mask.

Figure 8:
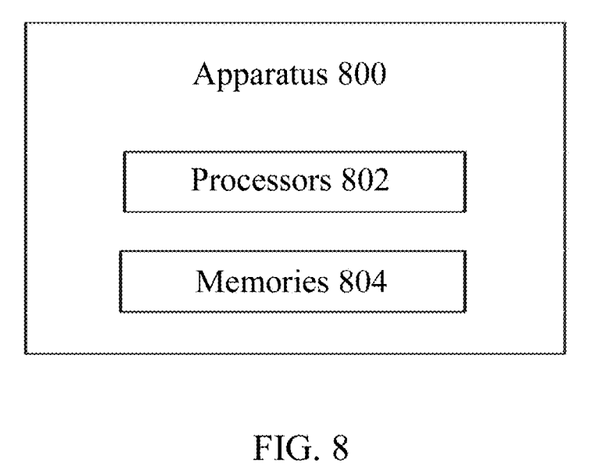
FIG. 8 shows a schematic diagram of a light-field display device 800 according to the embodiments of the present disclosure.

According to the embodiments of the present disclosure, a light-field display device is also provided. As shown in FIG. 8, the light-field display device 800 may comprise one or more processors 802 and one or more memories 804. Computer readable code is stored in the memories 804, and the computer readable code may perform the method for light-field display provided in accordance with the embodiments of the present disclosure when executed by the processors 802. According to the embodiments of the present disclosure, the processors may be implemented as a chip or module, for example, an FPGA, having a specific light-field processing algorithm function, According to the embodiments of the present disclosure, a computer readable recording medium is also provided, wherein computer readable code is stored in the computer readable recording medium, which when executed by a processor, may execute the method for light-field display according to the embodiments of the present disclosure.

According to the embodiments of the present disclosure, the method for light-field display, the apparatus, the device, and the recording medium are provided, where light-emitting points displaying same contents in different view zones are driven by a same driving circuit, so that the number of view zones of the light-field display is increased and a visible range of the light-field display is increased without increasing the number of the driving circuits, thereby realizing the practical use of the light-field display. The light-emitting points may correspond to one pixel or may correspond to a portion of one pixel.

Moreover, those skilled in the art will appreciate that aspects of the present application may be illustrated and described by a number of patentable categories or conditions, including any new and useful process, machine, product, or combination of materials, or any new and useful improvements to them. Accordingly, the respective aspects of the present application may be performed entirely by hardware, entirely by software (including firmware, resident software, microcode, etc.) or by a combination of hardware and software. The above hardware or software may be referred to as a "data block", "module", "engine", "unit", "component", or "system". Moreover, the respective aspects of the present application may be embodied in a computer product located in one or more computer readable mediums including a computer readable program code.

All terms (including technical and scientific terms) used herein have the same meaning as commonly understood by one of ordinary skill in the art, unless otherwise specified. It should also be appreciated those terms such as those defined in an ordinary dictionary should be interpreted as having meanings consistent with their meaning in the context of the related art, and not interpreted in an idealized or extremely formalized meaning unless explicitly stated herein.

The above is a description of the present disclosure and should not be construed as a limitation of the present disclosure. Although various exemplary embodiments of the present disclosure has been described, it should be readily understood by those skilled in the art that numerous modifications may be made to the exemplary embodiments without departing from the novel teaching and advantages of the present disclosure. Therefore, all such modifications are intended to be included within the scope of the present disclosure as defined by the appended claims. It should be appreciated that the foregoing is a description of the present disclosure and is not to be construed as limited to the particular embodiments disclosed, and modifications of the disclosed embodiments and other embodiments are intended to be included within the scope of the appended claims. The present disclosure is defined by the claims and their equivalents.

The invention claimed is:

1. A light-field display apparatus, comprising:
k display screens, and k is a positive integer greater than or equal to 1, wherein for each display screen of the k display screens, the each display screen including N display regions, each display region of the N display regions including M light-emitting points, and light-emitting points at a corresponding position of the N display regions being a light-emitting point group;
driving circuits, configured to drive the light-emitting points to emit light;
a lens group including at least one lens, wherein for the each display screen, the light-emitting points in the N display regions forming N view zones corresponding one by one to the N display regions by the lens group, wherein light-emitting points belonging to a same light-emitting point group in the N display regions are driven by a same driving circuit, and for the each display screen, N view zones of the each display screen are not overlapped with each other, and both N and M are positive integers greater than 1,
wherein in a case where k is greater than 1, corresponding view zones of the N display regions of the k display screens overlapping with each other.

2. The light-field display apparatus of claim 1, wherein
each light-emitting point is one pixel, each display region includes M pixels and the N display regions have M light-emitting point groups;
the N display regions form the N view zones by one lens, or form the N view zones by a plurality of lenses;
pixels of the N display regions are arranged in a same manner.

3. The light-field display apparatus of claim 1, further comprising switches connecting at least one display region of the N display regions and the driving circuits of the display region and configured to turn on or turn off driving of the display region by the driving circuits.

4. The light-field display apparatus of claim 3, wherein the connecting includes:
connecting the M light-emitting points in the display region to the corresponding driving circuits respectively by M switches.

5. The light-field display apparatus of claim 1, wherein the each display screen includes M pixels, each pixel of the M pixels comprising N light-emitting points formed by a mask, the N light-emitting points of each pixel corresponding to one light-emitting point group, the each display screen comprising M light-emitting point groups, each display region of the N display regions is formed by the light-emitting points at corresponding positions in the M light-emitting point groups, wherein
the M pixels respectively correspond to M lenses, and the light-emitting points in the N display regions form N view zones corresponding to the N display regions one by one by the M lenses.

\* \* \* \* \*